(12) United States Patent
Mukherjee et al.

(10) Patent No.: US 12,316,517 B2
(45) Date of Patent: *May 27, 2025

(54) STANDARDIZING ANALYSIS METRICS ACROSS MULTIPLE DEVICES

(71) Applicant: GOOGLE LLC, Mountain View, CA (US)

(72) Inventors: Prithwish Mukherjee, Mountain View, CA (US); Sujee Rajayogam, San Diego, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,175

(22) Filed: Jan. 30, 2024

(65) Prior Publication Data

US 2024/0171485 A1   May 23, 2024

Related U.S. Application Data

(63) Continuation of application No. 17/869,485, filed on Jul. 20, 2022, now Pat. No. 11,909,611.

(51) Int. Cl.
*H04L 43/065* (2022.01)
*G10L 15/22* (2006.01)
(Continued)

(52) U.S. Cl.
CPC ............ *H04L 43/065* (2013.01); *G10L 15/22* (2013.01); *G10L 15/30* (2013.01); *H04L 41/02* (2013.01); *G10L 2015/228* (2013.01)

(58) Field of Classification Search
CPC ... G10L 15/22; G10L 15/30; G10L 2015/228; H04L 41/02; H04L 43/065
See application file for complete search history.

(56) References Cited

U.S. PATENT DOCUMENTS

| 11,431,642 B2 * | 8/2022 | Piersol ............... H04L 67/5651 |
| 2016/0179787 A1 | 6/2016 | Deleeuw |

(Continued)

OTHER PUBLICATIONS

European Patent Office; International Search Report and Written Opinion issued in Application No. PCT/US2022/081156; 16 pages; dated Mar. 20, 2023.

(Continued)

*Primary Examiner* — Thomas J Dailey
(74) *Attorney, Agent, or Firm* — Gray Ice Higdon

(57) ABSTRACT

Implementations relate to generating standardized metrics from device specific metrics that are generated during an interaction between a user and an automated assistant. The metrics indicate events that occurred while processing an interaction of a user with the automated assistant and are specific to the particular configuration of the device with which the user is interacting. Conversion mappings are determined based on device characteristics that can be utilized to convert the device metrics into standardized metrics. Analysis metrics are generated based on the standardized metrics that are incapable of being generated from the device metrics. Some implementations include visually rendering the analysis metrics such that one or more of the analysis metrics are rendered more prominently than other metrics.

18 Claims, 6 Drawing Sheets

(51) Int. Cl.
    *G10L 15/30*     (2013.01)
    *H04L 41/02*     (2022.01)

(56) References Cited

U.S. PATENT DOCUMENTS

| | | |
|---|---|---|
| 2016/0350197 A1 | 12/2016 | Amichai |
| 2017/0083552 A1 | 3/2017 | Abolafia |
| 2017/0178626 A1 | 6/2017 | Gruber et al. |
| 2017/0329573 A1 | 11/2017 | Mixter |
| 2017/0357716 A1 | 12/2017 | Bellegarda et al. |
| 2019/0196890 A1 | 6/2019 | Bucchi et al. |
| 2019/0253277 A1 | 8/2019 | Venkataraman |
| 2019/0318729 A1 | 10/2019 | Chao et al. |
| 2019/0347326 A1 | 11/2019 | Kozhaya |
| 2020/0379878 A1 | 12/2020 | Vyas |
| 2021/0397610 A1 | 12/2021 | Singh et al. |
| 2024/0031261 A1 | 1/2024 | Mukherjee et al. |

OTHER PUBLICATIONS

Google Developers; "Create a Smart Home Action" reprinted from https://developers.google.com/assistant/smarthome/develop/create [retrieved from the internet Mar. 30, 2022]; 4 pages Mar. 30, 2022.

* cited by examiner

STANDARDIZING ANALYSIS METRICS ACROSS MULTIPLE DEVICES

BACKGROUND

Client devices can have different capabilities and may execute applications and/or otherwise perform differently depending on the hardware and/or software that are present on the devices. In some instances, the presence of one or more applications executing on a device may change the behavior of other applications and/or the behavior of hardware that is included in a device. To monitor the behavior of such devices, metrics are often generated that indicate timing of events such that a developer can review how a device behaved when one or more actions were performed by a user. For example, metrics can be generated that indicate timing of events that occurred when a user interacted with an automated assistant that is executing on a client device.

However, because of the numerous software and hardware configurations that are possible over any number of client devices, comparisons between behaviors of disparate devices can be difficult. For example, although a developer may be interested in monitoring the behavior of an application that is executing on different devices, it may be difficult to compare the metrics generated from the separate devices. Thus, generating aggregate metrics across multiple devices, each with its own capabilities and configurations, can lead to complex analysis in order to compensate for the numerous variations that are possible for each of the devices.

SUMMARY

Implementations disclosed herein relate to generating standardized metrics from device-specific metrics initially generated during an interaction of a user with an automated assistant. Some implementations include identifying device metrics that were generated while the user was interacting an automated assistant, identifying a set of conversion mappings based on one or more characteristics of the client device with which the user was interacting, generating, from the device metrics and using the conversion mappings, a standardized set of metrics, and generating analysis metrics by comparing the standardized set of metrics to other standardized metrics that were generated from device metrics of one or more other client devices.

Absent converting to standard metrics, generating analysis metrics would vary on a device-by-device basis. For example, absent converting to standard metrics a first analysis program may need to be created for processing device metrics from a first set of devices, a second analysis program may need to be created for processing device metrics from a second set of devices, a third analysis program may need to be created for processing device metrics from a third set of devices, etc. This can require simultaneously executing the multiple different analysis programs on remote servers, which can consume significant amounts of memory and/or other resources of the remote servers. Further, this can require separately maintaining (e.g., updating) each of the different analysis programs, which can require significant effort on the part of programmer(s) and significant utilization of client device resources utilized by the programmer(s). By converting to standard metrics according to implementations disclosed herein, a single analysis program that operates on the standard metrics can be utilized in generating the analysis metrics. While the single analysis program will be incapable of generating the analysis data based on the device metrics, it can generate the analysis data based on the standard metrics generated from the device metrics. Further, utilizing the single analysis program can achieve efficiencies in memory and/or other resources, as the need to simultaneously execute and/or maintain multiple analysis programs is obviated.

In some implementations, the conversion of the metrics from the initial set of metrics to the standardized set of metrics can be performed on the client device that is executing, at least in part, the automated assistant. For example, a client device can generate device metrics that indicate the timing of one or more events that occurred while the user was interacting with the instance of the automated assistant executing on the client device. The client device can additionally be executing one or more components that can identify, based on device characteristics, conversion mappings that can be utilized to standardize the device metrics into standardized metrics. The client device can generate the standardized metrics and subsequently transmit the standardized metrics to a remote computing device for further analysis. Also, for example, a second client device can generate standardized metrics from device metrics generated by the second device, and transmit those standardized metrics to the remote computing device. In response, the remote computing device can perform the comparison of the standardized metrics and generate analysis metrics, such as analysis metrics that are indicative of aggregate operation and/or behavior of the devices.

In some implementations, the conversion from the initial set of metrics to the standardized set of metrics can be performed by a different computing device. For example, a client device can provide the device metrics to a remote computing device, which can perform the conversion into standardized metrics and further transmit the standardized metrics to another remote computing device for further comparisons to generate analysis metrics.

In some implementations, as a user interacts with an automated assistant, metrics can be generated that indicate timing of one or more events. For example, a user can speak an utterance of "OK Assistant, send a message to Bob." The automated assistant can be continuously processing small amounts of audio data to determine whether a hotword has been uttered (e.g., an invocation phrase, such as "OK Assistant" or "Hey Assistant"). When a hotword is detected, the automated assistant can further process the audio data that follows the invocation phrase. Once processed, the automated assistant can determine whether it can fulfill a request that is included in the audio data (e.g., "what time is it") or whether the request should be transmitted to one or more applications for further processing. For example, for audio data that includes the request "send a message to Bob," the automated assistant can provide the request to a messaging application for further processing.

For each event that occurs, a timestamp can be generated that indicates when the event started and/or completed. For example, a microphone may be continuously active, whereby audio data is constantly received and, optionally, certain limited processing performed on the audio data (e.g., invocation phrase detection processing). At some point, the automated assistant can begin to process the audio data (or perform additional processing of the audio data), which can be a detectable event (e.g., "AUDIO_PROCESS_START" event). Processing the audio data can include performing speech to text processing and another event can be identified (e.g., "TRANSCRIPTION_START" event) with a corresponding timestamp. At some point, the transcription can be completed and another event can be generated (e.g., "TRANSCRIPTION_END" event). Thus, in some instances, at least three events can be generated for processing of audio data.

Following audio processing, the automated assistant can determine whether to further process a request that is included in the audio data or to transmit the request to another application for further processing. As with processing the audio data, one or more events can be generated to indicate events that occurred in the further processing of the audio data. For example, one or more components of the automated assistant can determine how to fulfill a request that is included in the audio data. An event (e.g., "FULFILLMENT_DETERMINATION") can be logged when the automated assistant has determined how to fulfill the request (e.g., by generating a response and/or by transmitting the request to another application), which can include a timestamp indicating when the automated assistant made the determination. In the case that the request is forwarded to a another application, events can be generated indicating the timing of starting to send the request, completing sending the request, starting to receive a response from the application, a completion time when the complete response is received, a delay between receiving a response from a client and rendering the response, and/or other events that can occur during the processing of a request.

In some implementations, events can be generated by an operating system and/or other device-specific application. Because each operating system may record events differently (e.g., different names for events, different events that are logged), a first device may have a log of metrics that is different from a second device, even when users of the two devices are each interacting with instances of the same automated assistant. Thus, in some implementations, metrics may not be in a standardized format that would otherwise allow events that occur on the different devices from being compared to each other.

As an example, a first device can include hardware for receiving and initial processing of audio data. Hardware can include a microphone and software can include a digital signal processor that can be specific to that device and different for a second device. Through experimentation, for example, a delay can be determined for the first device that indicates a time delay between the start of speech and when the speech is initially detected by the processor. Likewise, for the second device, a delay can be determined that is different from the delay of the first device. Thus, for each of the devices, a conversion mapping can be identified that indicates known timing delays between when an event is identified by the device and when the event actually occurred.

In some implementations, once device metrics have been identified, each metric indicating a timing of an event that occurred while the user was interacting with an automated assistant, one or more conversion mappings can be identified that can convert the device-specific metrics into standardized metrics. For example, for a first device, a "TRANSCRIPTION_START" and "TRANSCRIPTION_END" event may be generated, each with a timestamp indicating when transcription started and was completed by the automated assistant. For a second device, a "TRANSCRIPTION_START" and "TRANSCRIPTION_END" event may be logged, each with a timestamp indicating when automatic speech recognition started (TRANSCRIPTION_START) and was completed (TRANSCRIPTION_END) by the automated assistant. However, for each of the devices, a timing lag may be present based on, for example, the operation of the particular hardware and/or software of the devices. Therefore, the timestamp that is recorded for each of the events may not reflect an accurate time at which those events took place. Based on identified conversion mappings, each of the timestamps for the events can be adjusted such that, when the resulting standardized events are compared, the timing lag can be accounted for, thus allowing comparisons between the operations of the devices in a standardized manner.

In some implementations, one or more metrics can be based on operation of an application other than an automated assistant that is executing on the client device(s). For example, in some instances, a user may utter an invocation phrase, thus invoking the automated assistant, and follow-up the invocation with "call Bob." In response, the automated assistant can provide an application that is configured to make a phone call with information that can be utilized by that application to fulfill the request of the user. In some implementations, the responses of the application (in this case, a phone application) can be utilized to generate metrics indicative of the timing events performed by the application, such as events indicating when the application received the request, a time when the application responded to the request, a time when the application provided graphical rendering, and/or other behavior of the application.

In some implementations, metrics from separate devices, once standardized, can be compared to each other to generate analysis metrics. The analysis metrics can include generalizations on the operation and/or behavior of the automated assistants and/or other applications such that overall performance of the application(s) can be assessed over different devices that are executing different software and/or have different hardware capabilities. Thus, the analysis metrics are incapable of being generated from the device-specific metrics but must first instead be standardized to make comparisons more meaningful to the end user.

In some implementations, comparisons can be performed between standardized metrics from devices that share one or more characteristics. For example, devices that have a particular setting in common (e.g., language preference) can be compared to one another to generate analysis metrics that can be analyzed to better understand the performance of one or more applications that are executing on the devices. Also, for example, devices can be compared based on geographic locations of the devices, connectivity information, and/or other characteristics that can affect the performance of the hardware and/or software of the devices.

In some implementations, one or more analysis metrics can be visually rendered to provide an interface for a user to review and/or assess the metrics. For example, once device metrics are standardized and the standardized metrics compared to each other (e.g., averaged, aggregated), a graphical interface can be rendered that illustrates a timeline of the average timing of events over multiple devices. Also, for example, the rendering can be performed such that benchmark values and/or variation from benchmark values, for one or more of the metrics, can be more quickly identified. For example, for a given analysis metrics, a benchmark delay of 5 ms may be an industry standard or may be determined based on analysis metrics generated based on standardized metrics for a large quantity of device types. Once multiple standardized metrics have been aggregated, a delay of 10 ms may be identified for the metric. In this instance, a timeline can be rendered that indicates that metric in a particular color (e.g., red for being above the benchmark) and/or can otherwise be displayed more prominently to indicate to a user that is reviewing the interface that an issue may be present with the operation of the hardware and/or software of the devices that generated the original metrics.

The above description is provided as an overview of some implementations of the present disclosure. Further description of those implementations, and other implementations, are described in more detail below.

DETAILED DESCRIPTION

Figure 1:
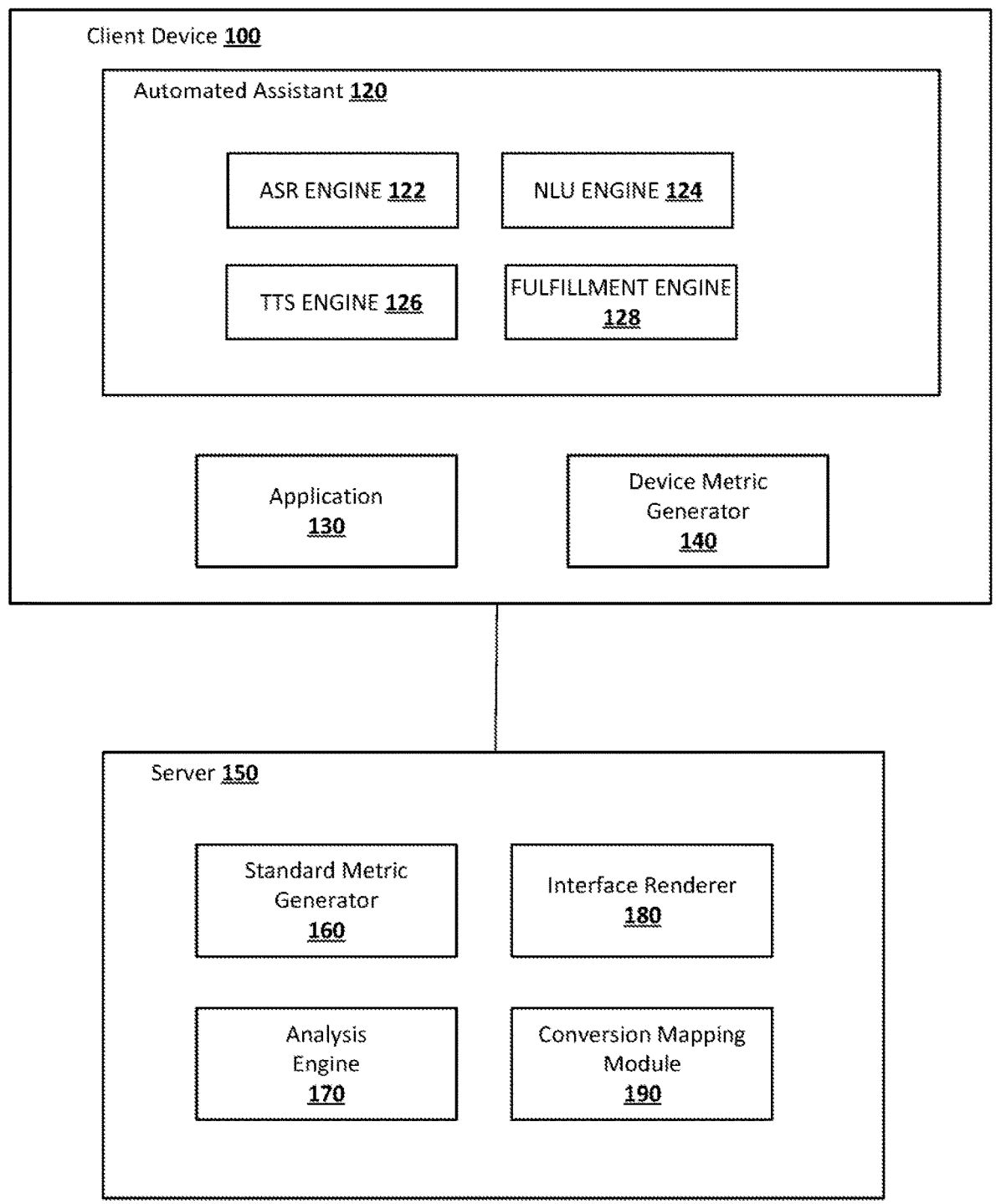
FIG. 1 illustrates an environment in which implementations described herein can be implemented.

Turning initially to FIG. 1, an example environment is illustrated in which various implementations can be performed. FIG. 1 includes an assistant device 100 (i.e., a client device executing an automated assistant client and/or via which an automated assistant is otherwise accessible), which executes an instance of an automated assistant client 120. One or more cloud-based automated assistant components can be implemented on one or more computing systems (collectively referred to as a "cloud" computing system) that are communicatively coupled to assistant device 100 via one or more local and/or wide area networks (e.g., the Internet). An instance of an automated assistant client 120, optionally via interaction(s) with one or more of the cloud-based automated assistant components, can form what appears to be, from the user's perspective, a logical instance of an automated assistant with which the user may engage in a human-to-computer dialog.

The client device 100 can be, for example: a desktop computing device, a laptop computing device, a tablet computing device, a mobile phone computing device, a computing device of a vehicle (e.g., an in-vehicle communications system, an in-vehicle entertainment system, an in-vehicle navigation system), a standalone interactive speaker, a smart appliance such as a smart television, and/or a wearable apparatus that includes a computing device (e.g., a watch having a computing device, glasses having a computing device, a virtual or augmented reality computing device).

Additional and/or alternative assistant devices may be provided and, in some of those implementations, speaker features for particular for a user can be shared amongst assistant devices for which the user is a registered user. In various implementations, the assistant device 100 may optionally operate one or more other applications (e.g., application 130) that are in addition to automated assistant 120, such as a message exchange client (e.g., SMS, MMS, online chat), a browser, and so forth. In some of those various implementations, one or more of the other applications can optionally interface (e.g., via an application programming interface) with the automated assistant 100, or include their own instance of an automated assistant application (that may also interface with any cloud-based automated assistant component(s)).

Automated assistant 120 engages in human-to-computer dialog sessions with a user via user interface input and output devices of the client device 100. To preserve user privacy and/or to conserve resources, in many situations a user must often explicitly invoke the automated assistant 120 before the automated assistant will fully process a spoken utterance. The explicit invocation of the automated assistant 120 can occur in response to certain user interface input received at the client device 100. For example, user interface inputs that can invoke the automated assistant 120 via the client device 100 can optionally include actuations of a hardware and/or virtual button of the client device 100. Moreover, the automated assistant client can include one or more local engines, such as an invocation engine that is operable to detect the presence of one or more spoken general invocation wakewords. The invocation engine can invoke the automated assistant 120 in response to detection of one of the spoken invocation wakewords. For example, the invocation engine can invoke the automated assistant 120 in response to detecting a spoken invocation wakeword such as "Hey Assistant," "OK Assistant", and/or "Assistant". The invocation engine can continuously process (e.g., if not in an "inactive" mode) a stream of audio data frames that are based on output from one or more microphones of the client device 100, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 120. As used herein, "invoking" the automated assistant 120 can include causing one or more previously inactive functions of the automated assistant 120 to be activated. For example, invoking the automated assistant 120 can include causing one or more local engines and/or cloud-based automated assistant components to further process audio data frames based on which the invocation phrase was detected, and/or one or more following audio data frames (whereas prior to invoking no further processing of audio data frames was occurring). For instance, local and/or cloud-based components can process captured audio data using an ASR model in response to invocation of the automated assistant 120.

In some implementations, multiple automated assistants can be executing on the client device 100, and the uttered invocation phrase may be different for each automated assistant. For example, a first automated assistant can have an invocation phrase of "OK Assistant 1," and in instances whereby the user utters the phrase "OK Assistant 1," the first automated assistant can be invoked such that additional audio data that precedes and/or follows the invocation phrase can be processed by the first automated assistant. Similarly, a second automated assistant, also executing on the client device 100, can be invoked when the user utters a second invocation phrase, such as "OK Assistant 2," whereby additional audio data that precedes and/or follows the invocation phrase can be processed by the second automated assistant. As further described herein, audio data can be encrypted using utterance features generated by the portion of the audio data that includes the user uttering the invocation phrase. Continuing with the previous example, in some implementations, the audio data that includes the user uttering "OK Assistant 1" can be encrypted with utterance features generated from the portion of the audio data that includes the user uttering "OK Assistant 1" such that only the first automated assistant (e.g., the automated assistant that is invoked with "OK Assistant 1"), having access to the speaker features generated from the user uttering "Ok Assistant 1," can decrypt the audio data.

The automated assistant client 120 in FIG. 1 is illustrated as including an automatic speech recognition (ASR) engine 122, a natural language understanding (NLU) engine 124, a text-to-speech (TTS) engine 126, and a fulfillment engine 128. In some implementations, one or more of the illustrated engines can be omitted (e.g., instead implemented only by cloud-based automated assistant component(s) 140) and/or additional engines can be provided (e.g., an invocation engine described above).

The ASR engine 122 can process audio data that captures a spoken utterance to generate a recognition of the spoken utterance. For example, the ASR engine 122 can process the audio data utilizing one or more ASR machine learning models to generate a prediction of recognized text that corresponds to the utterance. In some of those implementations, the ASR engine 122 can generate, for each of one or more recognized terms, a corresponding confidence measure that indicates confidence that the predicted term corresponds to the spoken utterance.

The TTS engine 126 can convert text to synthesized speech, and can rely on one or more speech synthesis neural network models in doing so. The TTS engine 126 can be utilized, for example, to convert a textual response into audio data that includes a synthesized version of the text, and the synthesized version audibly rendered via hardware speaker(s) of the assistant device 100.

The NLU engine 124 determines semantic meaning(s) of audio and/or text converted from audio by the ASR engine, and determines assistant action(s) that correspond to those semantic meaning(s). In some implementations, the NLU engine 124 determines assistant action(s) as intent(s) and/or parameter(s) that are determined based on recognition(s) of the ASR engine 122. In some situations, the NLU engine 124 can resolve the intent(s) and/or parameter(s) based on a single utterance of a user and, in other situations, prompts can be generated based on unresolved intent(s) and/or parameter(s), those prompts rendered to the user, and user response(s) to those prompt(s) utilized by the NLU engine 124 in resolving intent(s) and/or parameter(s). In those situations, the NLU engine 124 can optionally work in concert with a dialog manager engine (not illustrated) that determines unresolved intent(s) and/or parameter(s) and/or generates corresponding prompt(s). The NLU engine 124 can utilize one or more NLU machine learning models in determining intent(s) and/or parameter(s).

The fulfillment engine 128 can cause performance of assistant action(s) that are determined by the NLU engine 124. For example, if the NLU engine 124 determines an assistant action of "turning on the kitchen lights", the fulfillment engine 128 can cause transmission of corresponding data (directly to the lights or to a remote server associated with a manufacturer of the lights) to cause the "kitchen lights" to be "turned on". As another example, if the NLU engine 124 determines an assistant action of "provide a summary of the user's meetings for today", the fulfillment engine 128 can access the user's calendar, summarize the user's meetings for the day, and cause the summary to be visually and/or audibly rendered at the assistant device 100.

Device metric generator 140 can generate metrics based on events that occur while a user is interacting with the automated assistant 120. The device metrics can be device-specific metrics that indicate the timing of events that were performed by one or more components of the client device 100. For example, a user may speak the utterance, "OK Assistant, send a message to Bob." A first event can indicate a time for the start of audio data processing by the TTS engine 126. Further, another event can be generated by device metric generator 140 to indicate that an invocation of the automated assistant 120 has been detected (e.g., an indication of the event of determining that the user invoked the automated assistant by uttering "OK Assistant"). Further, another metric can be generated by device metric generator 140 to indicate that the user uttered a request (e.g., "send a message to Bob"). Thus, for each action that is performed by one or more components of the client device 100, an event can be generated that indicates a timing for the event.

In some implementations, any one of the components of the automated assistant 120, software executing on the client device 100, and/or hardware components of the client device 100 can generate metrics that can be included in the device metrics. For example, a speech detection component can generate an event when start of speech is detected, NLU engine 124 can generate an event when a meaning of speech has been determined (e.g., determination that speech includes a request), TTS engine 126 can generate events indicating the start and/or conclusion of speech to text conversion, and/or any other component that performs one or more actions. Additionally, device metrics generator 140 can generate metrics that indicate events that are performed by one or more other applications. For example, a metric can be generated when the automated assistant 120 transmits a request to an application 130, another metric can be generated when the application 130 responds to the request, another metric can be generated when the application 130 renders a graphical element, etc.

Figure 3:
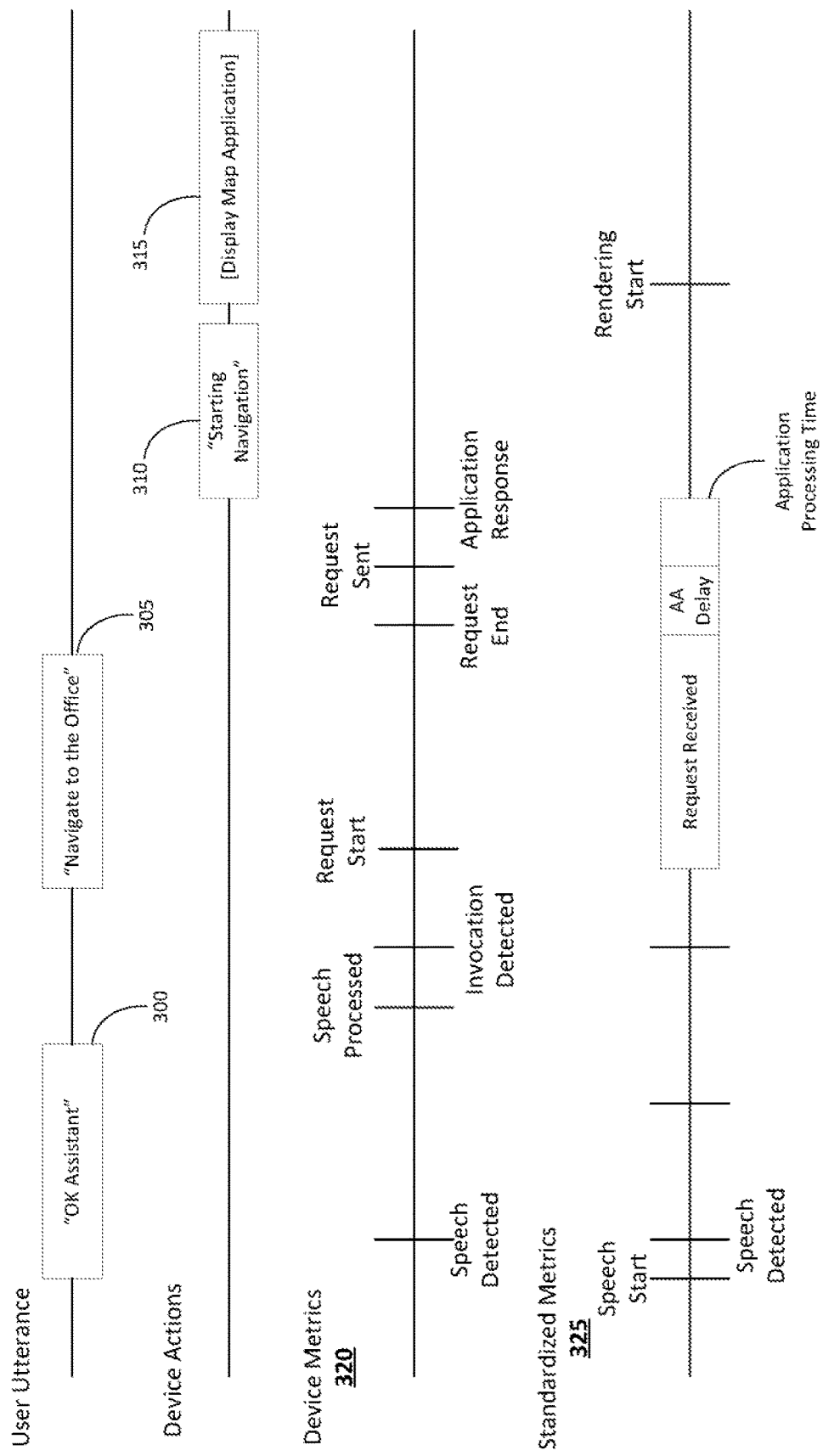
FIG. 3 illustrates a timeline of generated metrics indicating events that occurred while a user interacted with an automated assistant.

Referring to FIG. 3, a timing diagram is provided that illustrates metrics that can be generated by the device metric generator 140. As illustrated, the user has spoken the utterance, "OK Assistant, navigate to the office." The utterance includes an invocation 300 (i.e., "OK Assistant") and a request 305 (i.e., "navigate to the office"). In response, the automated assistant 120 can generate text from the audio data, determine that an invocation phrase has been uttered, and begin to process the request 305.

Once an invocation has been identified, the request 305 is provided to an application, such as application 130. The application can perform processing of the request and further provide a response to the request. As illustrated, the response includes providing speech 310 that indicates the action being taken (e.g., "Navigating to the office") as well as a graphical display 315 of a mapping application. Thus, the user is provided with a response to the request 305 from the application 130 such that the application 130 renders a visual representation of a map on a graphical interface of the client device 100 that can be utilized with navigation, as requested.

Device metric generator 130 can generate metrics for each event that occurs during the interaction of the user with the automated assistant 120. The device actions timeline 320 indicates a plurality of metrics that are generated in response to the interactions of the user with the automated assistant, as well as the actions performed by the application 130. As illustrated, a first metric, "Speech Detected," indicates a time when the processor of the device first detects that the user is speaking. Next, a metric of "Speech Processed" indicates that the processor of the client device 100 has processed the first portion of audio data to determine what was uttered by the user. Subsequently, once processed, the automated assistant 120 can determine that "Invocation Detected" and further continue to process the subsequent audio data. Finally, at the "Request Sent" metric, a request is provided to application 130, which can further process the request. In response, the application 130 provides audio 310 indicating "Navigating to the Office" and causes a graphical interface to be rendered 315.

The device metrics, such as those illustrated on timeline 320, can be provided to server 150 for further processing. Conversion mapping module 190 can determine one or more conversion mappings that can be utilized to generate standardized metrics from the device metrics. For example, referring again to FIG. 3, standardized metrics timeline 325 includes an "Actual Speech Start" metric that is not included in the device metrics timeline 320. Conversion mapping module 190 can determine, based on hardware and/or software of the client device 100, a length of time for this delay. For example, client device 100 may provide device characteristics, such as hardware types, operating system, and/or other software that is currently executing on the device to server 150, and conversion mapping module 190 can determine conversion mappings based on the specific configuration of client device 100.

As another example, a standardized metric of "Request Received" is included in the standardized metrics timeline 325, which can indicate the time that the request 305 is received from the user, as well as any delay that may be caused by processing of the request and/or transmitting of information between components. Further, standardized metrics timeline 325 includes an "Automated Assistant Response Time," which indicates the time between determining that the uttered speech includes a request and providing the request to the application 130. Finally, an "Application Processing Time" metric is determined based on the time taken for the application 130 to respond to the provided request.

In some implementations, a standardized metric can be determined based on an event that is not included in the device metrics. For example, referring to FIG. 3, "Speech Start" is not included in the device metrics and is instead determined based on the conversion mappings. Thus, the determined delay between first identification of speech and the actual start of speech is determined by the conversion mappings and is dependent on characteristics of the device, such as the microphone, speech processing speed, and/or other factors that must be accounted for before a delay between the actual start of speech and the detected start of speech can be determined. In some implementations, one or more standardized metrics can be determined based on multiple device metrics. For example, "Application Processing Time" can be determined based on a metric indicating when the application 130 was provided with a request (e.g., "Request Sent") and when the application 130 first provided a response (e.g., "Application Response").

Analysis engine 170 can determine, based on the standardized metrics, one or more analysis metrics that can be utilized by, for example, a developer, to determine the performance of the device in a standardized manner. In some implementations, metrics from multiple devices can be aggregated to generate metrics that are indicative of behavior of the automated assistant 120 and/or other applications 130 on different devices. Thus, the standardized metrics can be compared to each other in a standardized form that would not otherwise be possible using the device metrics alone. For example, delay introduced based on hardware differences can be factored out of application response times such that only delay in an application response that is caused by the application can be reviewed and/or further analyzed.

Figure 2:
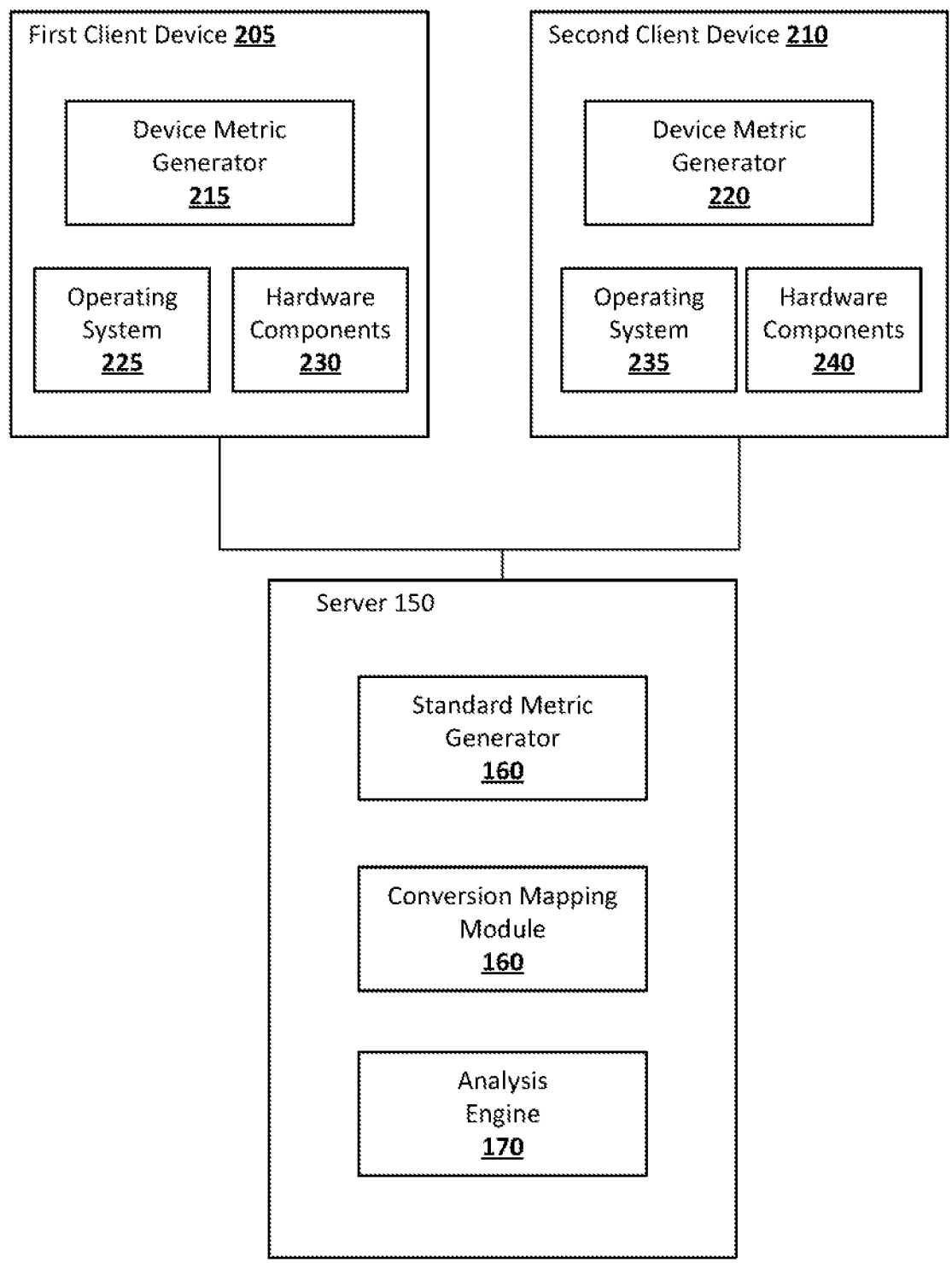
FIG. 2 illustrates another environment in which implementations described herein can be implemented.

Referring to FIG. 2, an environment is provided that illustrates multiple client devices 205 and 210, each of which includes different hardware and/or software components. First client device 205 includes operating system 225 and hardware components 230 whereas second client device 210 includes operating system 235 and hardware components 240. Device metric generator 215 can generate device metrics for first client device 205 and device metric generator 220 can generate device metrics for second client device 210, as previously described. In some implementations, once device metrics have been generated by each of the device metric generators, the metrics can be provided to server 150 for further analysis.

In some implementations, at least a portion of the conversion of the device metrics into standardized metrics can be performed by the client device(s). For example, in some implementations, at least a portion of the actions performed by the conversion mapping module 160 and/or standard metric generator 160 can be performed by the client device. In some implementations, the client device(s) can provide device characteristics to the server 150 to indicate hardware and/or software components that are present on the device. For example, first client device 205 can provide the device metrics as well as indications of the operating system 225 and/or hardware components 230 to the server 150. In response, conversion mapping module 160 can determine the conversion mappings based on the indications of the operating system 225 and/or hardware components 230 and standard metric generator 160 can determine the standardized metrics based on the received device metrics and the determined conversion mappings. In some implementations, at least a portion of the actions performed by the standard metric generator 160 and/or conversion mapping module 160 can be performed by another remote computing device. For example, first client device 205 and second client device 210 can provide the device metrics to a second remote computing device, which can determine the conversion mappings and further generate the standardized metrics. The standardized metrics can then be provided to server 150, which can perform further analysis to generate the analysis metrics.

In some implementations, first client device 205 and/or second client device 210 can provide additional device characteristics that can be utilized by analysis engine 170 in generating analysis metrics. For example, a user of first client device 205 may seta language setting of first client device 205 to a first language and a user of second client device 210 may set a language preference setting to a second language. In response, analysis engine 170 can determine whether the standardized metrics from the two devices should be compared. In instances whereby language preference settings are the same, analysis metrics generated for the devices may be more meaningful to the developer than instances whereby the language preferences are different. As another example, in some implementations, first client device 205 and/or second client device 210 may provide a geographic location and/or other device information that can be utilized by analysis engine 170 in generating analysis metrics for the devices.

In some implementations, a user may interact with instances of an automated assistant over multiple devices. For example, a user may start an interaction with an instance of an automated assistant that is executing on first client device 205, which can be a smart speaker in a first location. Subsequently, the user may continue the same interaction on second client device 210 with a second instance of the automate assistant, which can be executing on a smartphone that is in a second location. Thus, referring again to FIG. 3, at least a portion of device metrics 320 can be generated by the first client device 205, and another portion of the device metrics 320 can be generated by the second client device 210. In that instance, the two client devices 205 and 210 can have different hardware and/or software configurations, and in order to compare the device metrics to each other or to metrics of another device, metrics generated by each of the devices may require separate conversion mappings. Thus, the first client device 205 can generate metrics, which are converted into standardized metrics via a first conversion mapping, and the second client device 210 can generate metrics, which are converted into standardized metrics via a second conversion mapping.

Referring again to FIG. 1, interface renderer 180 can generate a graphical interface that indicates one or more of the analysis metrics that are generated by analysis engine 170. For example, interface renderer 180 can generate a timeline, similar to the timelines illustrated in FIG. 3, to provide visual assistance in analyzing the resulting analysis metrics. In some implementations, one or more of the analysis metrics that are provided via a graphical interface can be rendered such that metrics of most interest to a developer are rendered differently than other metrics. For example, for a given metric, a benchmark standard can be identified. In instances whereby a device (or aggregate metrics over multiple devices) does not satisfy the benchmark standard, the metric may be rendered in a different color and/or rendered more prominently than other metrics.

In some implementations, analysis engine 170 can utilize the standardized metrics generated from the device metrics of first client device 205 and the standardized metrics generated from the device metrics of second client device 210 to generate analysis metrics that are indicative of behavior of, for example, instances of an automated assistant executing on each of the devices. For example, the device metrics of first client device 205 may be, at least in part, dependent upon the operating system 225 and/or of hardware components 210. Thus, comparison of the behavior of the automated assistant to the behavior of the automated assistant executing on second client device 210 may be impossible given the number of variances that may be possible with different software and/or hardware on the devices. By generating standardized metrics and then comparing the standardized metrics from the two devices, a developer may be provided with better analysis tools to determine how hardware and/or software affects the performance of an application.

Figure 4:
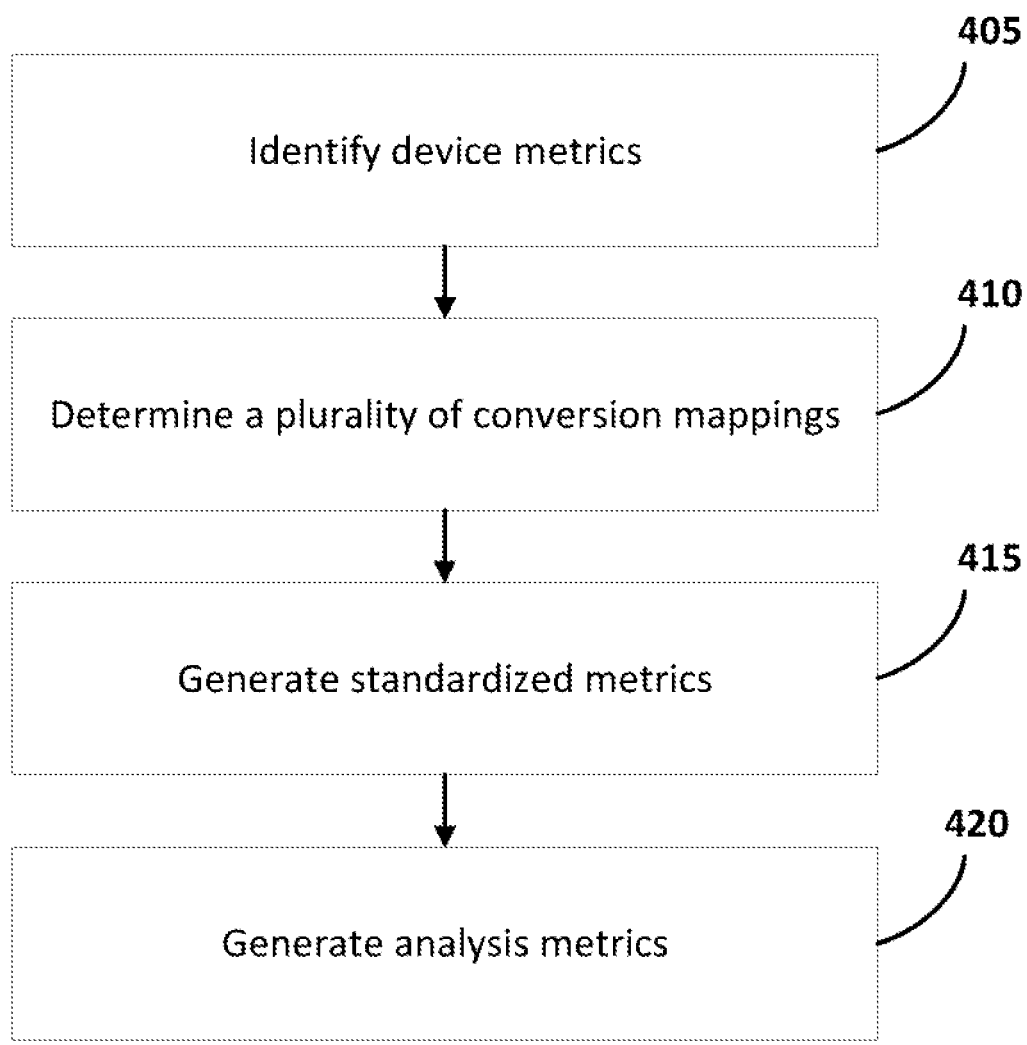
FIG. 4 illustrates a flowchart of a method for processing standardized metrics generated from device specific metrics.

Referring to FIG. 4, a flowchart is provided that illustrates a method for processing standardized metrics generated from device metrics. In some implementations, one or more steps of the method can be omitted or combined, and/or one or more additional steps can be included in the method. The method can be performed by one or more components that are illustrated in the environment of FIG. 1.

At step 405, device metrics are identified. The device metrics are generated, by a client device, such as client device 100, by a component that shares one or more characteristics with device metrics generator 140. In some implementations, the metrics are generated during an interaction between a user and an automated assistant that is executing on the client device. The metrics can indicate the timing of events that occurred during the interaction, such as responses by the automated assistant, one or more applications, and/or indications of starting and/or stopping times for processing of inputs. For example, a device metric can include an event to indicate when processing of audio data has started and a second device metric can be generated that indicates a time when the processing of the audio data has concluded.

At step 410, a plurality of conversion mappings are determined. The plurality of conversion mappings can be determined by a component that shares one or more characteristics with conversion mapping module 190. For example, once device metrics are generated by the device metric generator 140 of client device 100, the device metrics can be provided to the server 150 for further processing. In some implementations, indications of the conversion mappings and/or information related to the hardware and/or software capabilities and/or configurations of client device 100 can be provided to conversion mapping module 190 such that conversion mapping module 190 can determine, based on the device characteristics, the conversion mappings.

At step 415, standardized metrics are generated. The standardized metrics are generated by converting, using the determined conversion mappings, the device metrics. For example, a conversion mapping may indicate that, based on the processing capabilities of the client device 100, an event be adjusted and/or a new event be generated to include with the standardized metrics. Thus, in some instances, conversion mappings may change the timing of one or more events that are included with the device metrics. In some instances, for example, the conversion mappings can indicate that additional metrics, indicating events, be generated that were not included in the device metrics.

At step 420, a remote computing device processes the standardized metrics to generate analysis metrics. The analysis metrics can include one or more interferences that are determined based on the standardized metrics. In some implementations, the remote computing device, such as server 150, cannot generate the analysis metrics from the device metrics. For example, without converting the device metrics to standardized metrics, one or more metrics may be incorrect, inaccurate, and/or not included such that the analysis metrics cannot be otherwise generated. In some implementations, the analysis metrics are generated by a component that shares one or more characteristics with analysis engine 170.

Figure 5:
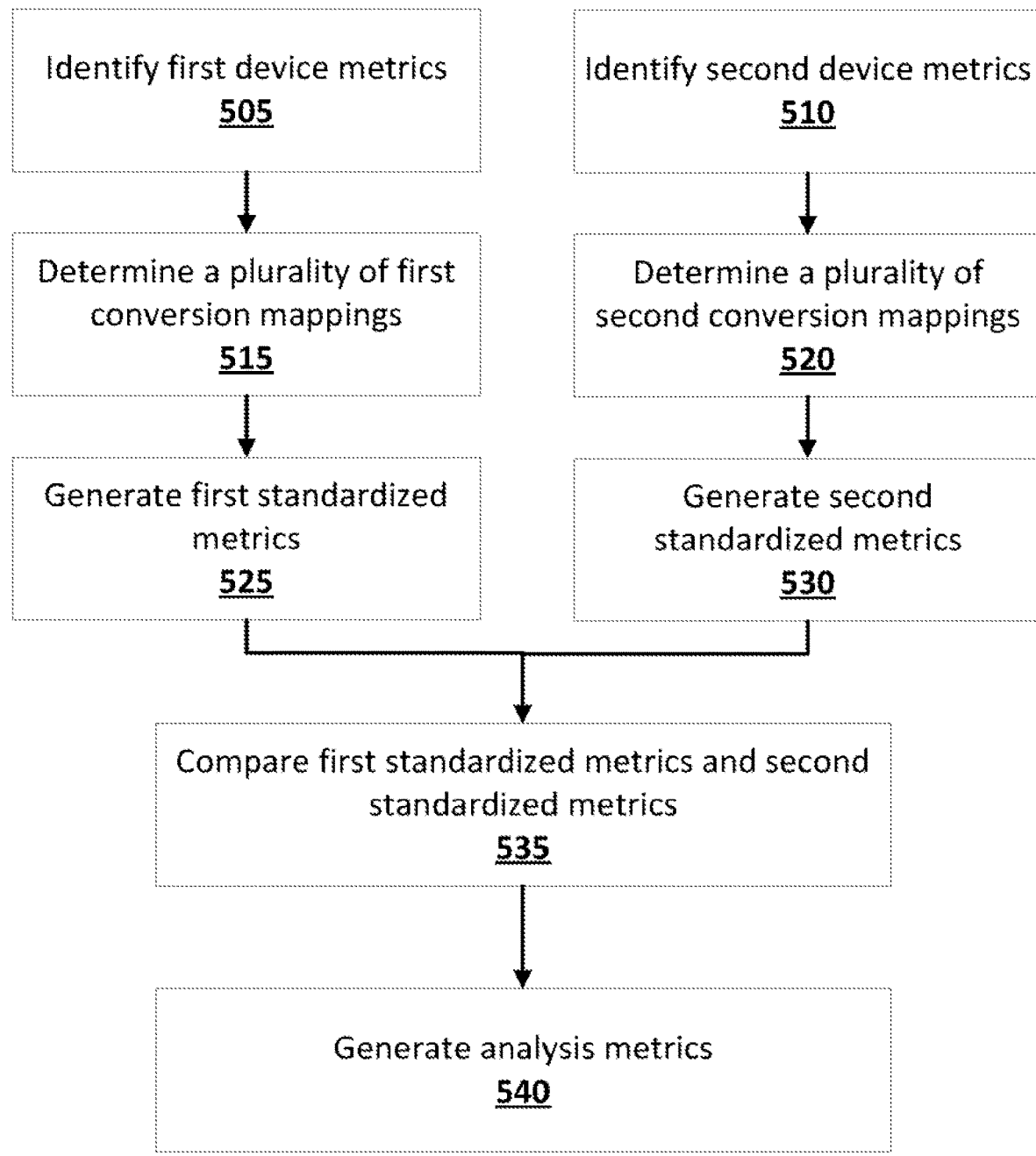
FIG. 5 illustrates a flowchart of a method for processing standardized metrics generated from device specific metrics across multiple devices.

Referring to FIG. 5, a flowchart is provided that illustrates a method for processing standardized metrics from multiple devices. In some implementations, one or more steps of the method can be omitted or combined, and/or one or more additional steps can be included in the method. The method can be performed by one or more components that are illustrated in the environment of FIG. 2.

At step 505, first device metrics are received from a first client device. The client device can share one or more characteristics with first client device 205 of FIG. 2. The first device metrics are generated during an interaction of the user with an automated assistant that is executing on the first client device. As previously described, the metrics can each indicate a timing of an event that occurred during the interaction. For example, the first device metrics can share one or more characteristics with the metrics illustrated in FIG. 3 and as previously described.

At step 510, second device metrics are received from a second client device. The second client device can share one or more characteristics with second client device 210 of FIG. 2. For example, first client device and second client device may have different capabilities, different software, different operating systems, different hardware, and/or have different applications installed and/or executing while the metrics are generated. Thus, the first device metrics and second device metrics are not standardized across the devices and cannot be meaningfully compared to generate analysis metrics.

At step 515, one or more first characteristics are utilized to determine a plurality of first conversion mappings. The first conversion mappings are based on, for example, hardware and/or software of the first client device and may be unique to the device. At step 520, one or more second characteristics are utilized to determine a plurality of second conversion mappings. The second conversion mappings are based on, for example, hardware and/or software of the second client device and may be different from the first conversion mappings.

At step 525, first standardized metrics are generated from the first device metrics, utilizing the first conversion mappings. At step 530, second standardized metrics are generated from the second device metrics. In both instances, the device specific metrics are converted such that further analysis can be performed over both sets of metrics in a more meaningful manner than otherwise would be possible in performing analysis (e.g., comparing, aggregating) the device specific metrics.

At step 535, at least a portion of the first standardized metrics are compared to at least a portion of the second standardized metrics. The comparison can be performed by a component that shares one or more characteristics with analysis engine 170. At step 540, analysis metrics are generated based on the comparison. The resulting analysis metrics cannot be generated from the first device metrics and the second device metrics due to differences in device characteristics, as previously described. For example, the first device and the second device may have different hardware components, each of which introduces a set amount of delay into one or more operations, thereby skewing one or more metrics. By standardizing the device metrics prior to comparison, delays from hardware and/or software components can be compensated for such that the resulting analysis metrics are more meaningful and accurate to a developer.

In some implementations, an interaction with an automated assistant may occur over multiple devices. For example, in some instances, a user may start an interaction with an automated assistant via a smartphone, continue the interaction on a smart speaker, and conclude the interaction on another device that is integrated into a vehicle. In some implementations, each of those devices can have different hardware and/or software that is executing the automated assistant and/or one or more other applications. Thus, for each portion of the interaction, different device-specific metrics can be identified. In some implementations, for each of the device-specific metrics that were utilized during the interaction, a conversion mapping can be identified for each set of metrics. Thus, for an interaction, multiple conversion mapping can be utilized to convert the metrics of an interaction into standardized metrics.

Figure 6:
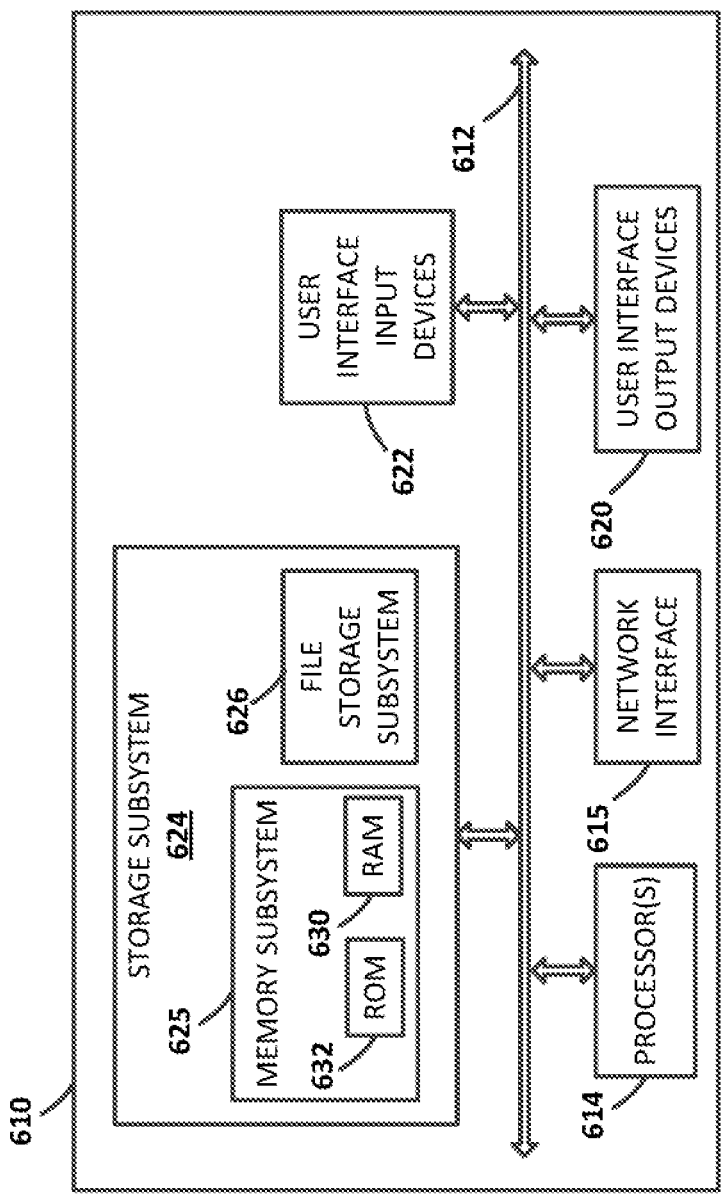
FIG. 6 illustrates an example architecture that can be utilized to implement one or more methods described herein.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods of FIGS. 3A-4B, and/or to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

Implementations disclosed herein include a method, comprising: identifying device metrics generated during an interaction between a user and an automated assistant that is executing on a client device, wherein the device metrics indicate timing of events that occurred during the interaction; determining, based on one or more characteristics of the client device, a plurality of conversion mappings; generating standardized metrics, wherein generating the standardized metrics includes converting one or more metrics of the device metrics to one or more standard metrics using the conversion mappings; and causing a remote computing device to process the standardized metrics in generating analysis metrics, wherein the remote computing device is incapable of generating the analysis metrics from the device metrics.

These and other implementations of the technology disclosed herein can include one or more of the following features.

In some implementations, generating the standardized metrics is performed by the client device, and causing the remote computing device to process the standardized metrics in generating the analysis metrics comprises: transmitting, by the client device, the standardized metrics to the remote computing device.

In some implementations, generating the standardized metrics is performed by a second remote computing device, and the method further comprises: transmitting, by the client device, the device metrics to the second remote computing device, and causing the remote computing device to process the standardized metrics in generating the analysis metrics comprises transmitting, by the second remote computing device, the standardized metrics to the remote computing device.

In some implementations, in generating the analysis metrics, the remote computing device compares the standardized metrics to second standardized metrics. In some of those implementations, the method further includes identifying second device metrics generated during an interaction between an additional user and a second automated assistant that is executing on a second client device; determining, based on one or more characteristics of the second client device, a plurality of second conversion mappings; and generating the second standardized metrics, wherein generating the second standardized metrics includes converting one or more of the metrics of the second device metrics using the second conversion mappings.

In some implementations, the client device is further executing an application, and wherein at least a given metric, of the device metrics is based on timing of one or more events related to the application.

In some implementations, the one or more characteristics of the client device include operating system characteristics based on an operating system that is executing on the client device.

In some implementations, the one or more characteristics of the client device include hardware characteristics of one or more hardware components of the client device.

In some implementations, a given standardized metric, of the standardized metrics, indicates timing of a given event that is not included among the events indicated by the device metrics. In some of those implementations, generating the standardized metrics comprises using a given conversion mapping, of the conversion mappings, to infer the given standardized metric based on one or more of the device metrics. In other implementations, generating the given conversion mapping based on a timing variation caused by a component, and based on determining the client device includes the component. In yet other of those implementations, the given event is a response, from an application, to a request included in a spoken utterance that is processed by the automated assistant.

In another aspect, implementations disclosed herein include another method, comprising: receiving, from a first client device, first device metrics generated during a first interaction between a first user and a first instance of an automated assistant that is executing on the first client device, wherein the first device metrics indicate timing of events that occurred during the first interaction, receiving, from a second client device, second device metrics generated during a second interaction between a second user and a second instance of the automated assistant that is executing on the second client device, wherein the second device metrics indicate timing of events that occurred during the second interaction, determining, based on one or more first characteristics of the first client device, a plurality of first conversion mappings, determining, based on one or more second characteristics of the second client device, a plurality of second conversion mappings, generating first standardized metrics, wherein generating the first standardized metrics includes converting one or more of the first device metrics to one or more standard metrics using the first conversion mappings, generating second standardized metrics, wherein generating the second standardized metrics includes converting one or more of the second device metrics to one or more of the standard metrics using the second conversion mappings, comparing at least one of the first standardized metrics to at least one of the second standardized metrics; and generating analysis metrics based on the comparison.

These and other implementations of the technology disclosed herein can include one or more of the following features.

In some implementations, at least one of the characteristics of the first client device is different from at least one of the characteristics of the second client device.

In some implementations, the method further includes: receiving, from the first client device, additional first device characteristics; receiving, from the second client device, additional second device characteristics; and prior to comparing at least one of the first device metrics to at least one of the second device metrics: determining that at least one of the additional first device characteristics is similar to at least one of the additional second device characteristics. In some of those implementations, the additional first device characteristics include a geographic location of the first client device. In others of those implementations, the additional first device characteristics include a language preference setting of the first client device.

In some implementations, the method further includes rendering an interface that indicates one or more of the standardized metrics. In some of those implementations, the method further includes identifying, for an analysis metric of interest, a benchmark standard; and visually rendering the analysis metric of interest based on whether the analysis metric of interest satisfies the benchmark standard.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The invention claimed is:

1. A method, performed by one or more processors, the method comprising:
    identifying device-specific metrics generated during an interaction between a user and an automated assistant that is executing on a client device, wherein the device-specific metrics indicate timing of events that occurred during the interaction, including a device delay introduced by a device operating system that is specific to the client device;
    determining, based on one or more characteristics of the device operating system, a plurality of conversion mappings;
    generating standardized metrics, wherein generating the standardized metrics includes converting one or more metrics of the device-specific metrics to one or more standard metrics using the conversion mappings; and
    causing a remote computing device to process the standardized metrics in generating analysis metrics, wherein the remote computing device is incapable of generating the analysis metrics from the device-specific metrics.

2. The method of claim 1, wherein generating the standardized metrics is performed by the client device, and wherein causing the remote computing device to process the standardized metrics in generating the analysis metrics comprises:
    transmitting, by the client device, the standardized metrics to the remote computing device.

3. The method of claim 1, wherein generating the standardized metrics is performed by a second remote computing device, and further comprising:
    transmitting, by the client device, the device-specific metrics to the second remote computing device;
    wherein causing the remote computing device to process the standardized metrics in generating the analysis metrics comprises:
        transmitting, by the second remote computing device, the standardized metrics to the remote computing device.

4. The method of claim 1, wherein, in generating the analysis metrics, the remote computing device compares the standardized metrics to second standardized metrics.

5. The method of claim 4, further comprising:
    identifying second device-specific metrics generated during an interaction between an additional user and a second automated assistant that is executing on a second client device;
    determining, based on one or more characteristics of the second client device, a plurality of second conversion mappings; and
    generating the second standardized metrics, wherein generating the second standardized metrics includes converting one or more of the metrics of the second device-specific metrics using the second conversion mappings.

6. The method of claim 1, wherein the client device is further executing an application, and wherein at least a given metric, of the device-specific metrics is based on timing of one or more events related to the application.

7. The method of claim 1, wherein a given standardized metric, of the standardized metrics, indicates timing of a given event that is not included among the events indicated by the device-specific metrics.

8. The method of claim 7, wherein generating the standardized metrics comprises using a given conversion mapping, of the conversion mappings, to infer the given standardized metric based on one or more of the device-specific metrics.

9. The method of claim 8, further comprising:
    generating the given conversion mapping based on a timing variation caused by a component, and based on determining the client device includes the component.

10. The method of claim 7, wherein the given event is a response, from an application, to a request included in a spoken utterance that is processed by the automated assistant.

11. A method, performed by on one or more processors, the method comprising:
    receiving, from a first client device of a plurality of client devices, first device-specific metrics generated during an interaction between a user and an automated assistant that is executing on the plurality of client devices, wherein the first device-specific metrics indicate timing of events that occurred during the interaction, including a first device delay introduced by a first device operating system that is specific to the first device;
    receiving, from a second client device of the plurality of client devices, second device-specific metrics generated during the interaction between the user and the automated assistant that is executing on the plurality of client devices, wherein the second device-specific metrics indicate timing of events that occurred during the interaction, including a second device delay introduced by a second device operating system that is specific the second device, wherein the second device delay is different than the first device delay;
    determining, based on one or more first characteristics of the first device operating system, a plurality of first conversion mappings;

determining, based on one or more second characteristics of the second device operating system, a plurality of second conversion mappings;

generating first standardized metrics, wherein generating the first standardized metrics includes converting one or more of the first device-specific metrics to one or more standard metrics using the first conversion mappings;

generating second standardized metrics, wherein generating the second standardized metrics includes converting one or more of the second device-specific metrics to one or more of the standard metrics using the second conversion mappings;

comparing at least one of the first standardized metrics to at least one of the second standardized metrics; and generating analysis metrics based on the comparison.

12. The method of claim 11, wherein at least one of the characteristics of the first device operating system is different from at least one of the characteristics of the second device operating system.

13. The method of claim 11, further comprising:

receiving, from the first client device, additional first device characteristics;

receiving, from the second client device, additional second device characteristics; and prior to comparing at least one of the first device-specific metrics to at least one of the second device-specific metrics:

determining that at least one of the additional first device characteristics is similar to at least one of the additional second device characteristics.

14. The method of claim 13, wherein the additional first device characteristics includes a geographic location of the first client device.

15. The method of claim 13, wherein the additional first device characteristics includes a language preference setting of the first client device.

16. The method of claim 15, further comprising:

rendering an interface that indicates one or more of the standardized metrics.

17. The method of claim 16, further comprising:

identifying, for an analysis metric of interest, a benchmark standard; and visually rendering the analysis metric of interest based on whether the analysis metric of interest satisfies the benchmark standard.

18. A method, performed by on one or more processors, the method comprising:

receiving, from a first client device of a plurality of client devices, first device-specific metrics generated during an interaction between a user and an automated assistant that is executing on the plurality of client devices, wherein the first device-specific metrics indicate timing of events that occurred during the interaction, including a first device delay introduced by a first device hardware that is specific to the first device;

receiving, from a second client device of the plurality of client devices, second device-specific metrics generated during the interaction between the user and the automated assistant that is executing on the plurality of client devices, wherein the second device-specific metrics indicate timing of events that occurred during the interaction, including a second device delay introduced by a second device hardware that is specific the second device, wherein the second device delay is different than the first device delay;

determining, based on one or more first characteristics of the first device hardware, a plurality of first conversion mappings;

determining, based on one or more second characteristics of the second device hardware, a plurality of second conversion mappings;

generating first standardized metrics, wherein generating the first standardized metrics includes converting one or more of the first device-specific metrics to one or more standard metrics using the first conversion mappings;

generating second standardized metrics, wherein generating the second standardized metrics includes converting one or more of the second device-specific metrics to one or more of the standard metrics using the second conversion mappings;

comparing at least one of the first standardized metrics to at least one of the second standardized metrics; and generating analysis metrics based on the comparison.

* * * * *